June 20, 1939.  H. E. KLEINSCHMIDT  2,163,494
MACHINE FOR MARKING LEATHER AND THE LIKE
Filed Jan. 14, 1937   7 Sheets-Sheet 6

Inventor,
H. E. Kleinschmidt
By: Glascock Downing Seibold
Attys.

Patented June 20, 1939

2,163,494

UNITED STATES PATENT OFFICE 2,163,494

MACHINE FOR MARKING LEATHER AND THE LIKE

Hans Erich Kleinschmidt, Berlin, Germany

Application January 14, 1937, Serial No. 120,625
In Germany January 15, 1936

26 Claims. (Cl. 101—43)

My invention relates to machines for enabling the distribution of the thickness of sheet material, especially of large pieces of leather, for the purpose of facilitating the selection of small individual pieces, such as soles and the like, to be visibly ascertained by determining by mechanical means the thickness of the sheet material at a plurality of points and stamping the thickness values on the material at the respective points.

Machines of the type referred to have been proposed, in which a feeler which is movable transversely with respect to the sheet material or article to be measured is maintained in contact with the said material or article while the latter is supported upon a support, the said feeler being in operative connection with a type carrier through a mechanism which amplifies its movement, in such a manner that the variation of the distance of the feeler from the support due to the difference in the thickness of the material produces an amplified movement of the type carrier corresponding to the transmission ratio of the mechanism. The type carrier which is arranged above a point (impression point) which is closely adjacent the point at which the feeler bears against the article being measured (measuring point) is so adjusted by the feeler through the mechanism mentioned that one of its types which corresponds to the instantaneous distance of the feeler from the support and therefore to the thickness value of the article being measured at the point in question, comes to lie perpendicularly over the impression point. By lowering the type carrier the type in question will be caused to make the impression on the article being measured. If in the machine a plurality of such units each comprising a feeler, a type carrier, a transmission mechanism connecting the latter to the feeler and a lowering device for the type carrier (impression or printing device) be arranged in a row or in a plurality of rows transversely to the direction of feed of the article being measured and the impression or printing devices be put into operation at suitable intervals, then the article being measured, on being passed through the machine is printed upon at numerous places distributed over its surface with figures or the like corresponding to the thickness of the material at the places in question.

The machine forming the subject of my present invention differs from the known machines of this type mainly in the construction, arrangement and mode of operation of the feelers, the type carriers, the printing devices and the mechanisms connecting these parts to one another as well as in their co-operation with one another and in the construction, mode of driving and operation of the entire machine. By means of the improvements according to my invention, the machine is rendered particularly suitable for the treatment of all kinds of leather material, especially the heaviest and most refractory sole leathers. Further, the accuracy of measurement and the speed of operation is improved and a more compact arrangement of the bank of impression points is rendered possible. Moreover, the cost of manufacture of a machine according to the invention, notwithstanding its special advantages over the known machines, is lower. Further advantages and features of the invention will be disclosed in the description of the invention with reference to the accompanying drawings.

In the drawings,

Fig. 10 shows a detail of the mechanism for automatically stopping the machine, while

Fig. 12 is a vertical section through the upper part of the machine.

First of all the mode of operation of the machine will be briefly described:

The leather or the like to be marked, hereinafter referred to as the material to be measured, is fed to the measuring and stamping devices of which, in the machine illustrated, there are twenty units arranged at equal distances apart on a traverse extending over the entire length of the machine and formed by two channel irons 1, 2, with the aid of a feed roller 3, against which the material A to be measured is pressed by means of a second smaller roller 4. The driving of the roller 3 is effected intermittently in such a manner that the measuring and stamping of the material can take place during the pauses in the feed movement. The intermittent drive of the feed roller is effected by means of a Maltese cross drive 5, 6 (Fig. 2), namely from an electromotor 7, which moreover with the aid of a chain 8 drives a camshaft 9 which constitutes the common driving member for all the twenty measuring and stamping devices and accordingly extends over the entire length of the machine. The conditions are so arranged that the feed roller 3 comes to rest after each eighth part of a revolution and the measuring and stamping devices, the movements of which are dependent on the camshaft 9, then come into operation. As soon as the operation of the measuring and stamping devices ceases, the feed roller 3 executes a further partial rotation amounting to an eighth part of its circumference and so on until the material to be measured, which runs over a table formed by an I-beam 10, has travelled through under the measuring and stamping devices in its entire extension.

The general structure of the machine is as follows: The two channel irons 1, 2 which are arranged on edge at a certain distance apart from one another are at their ends screwed or riveted through angle irons 11 to side plates 12, 12 which are carried by pedestals 15, 15. These pedestals, in addition, carry the I-beam 10 serving as table or support and which is likewise screwed to the side plates 12, 12 through angles 13. The pedestals 15, 15 are connected to one another at the bottom by means of a rod 16 which at the same time serves as bearing axle for a pedal 17. On the upper side of the channel irons 1, 2 are provided a considerable number of bearings 18 which, together with two bearings 19, 19 screwed on the side plates 12, 12, carry the camshaft 9, which is preferably composed of several separate pieces connected together by means of claw couplings or the like. The camshaft 9 is driven, as already mentioned, by means of a chain 8 which runs over two sprocket wheels 20, 21, one of which is fixed on the camshaft 19 outside the respective side plate 12 and the other on a short shaft 22 journalled on the I-beam 10 and on the respective side plate 12. This latter shaft also carries a gear wheel 23 which meshes with a pinion 24 which is fixed on the shaft 25 of a worm gear 26 of the motor 7. By means of the gear 26 the speed of the motor is reduced by a considerable amount in such a manner that the shaft 22 only rotates at 30 revolutions per minute. A stud 27 (Figs. 2 and 3) extends laterally from the gear wheel 23, the said stud engaging in the eight slots 28 of the Maltese cross 5 which is mounted on the shaft 29 of the feed roller 3. In this manner during the running of the motor 7 the feed roller is rotated intermittently by the amount of an eighth part of a revolution each time. The above mentioned pressing roller 4 which is mounted above the feed roller is journalled at both ends in bearings 30. From each of these bearings there extends upwardly a kind of piston 31 which is guided in a cylinder 32, which at its upper end is rigidly connected to an angle piece 33 which is secured to the respective side plate 12. A wire cable 34 engages the upper end of the piston 31, the said cable being passed over a roller 35 through a slot 36 in the plate 12 and extending outside the plate downwardly (Fig. 2) where it is connected to an arm 37 fixed on the axle 16 of the pedal 17, so that on depressing the pedal the bearings 30 of the pressing roller 4 are raised and the latter can be removed from the feed roller 3. Ordinarily the roller 4 is pressed downwardly on the feed roller by means of powerful helical springs 38 which at one end bear against the angle 33 and at the other end against the bearings 30, so that the material to be measured is gripped securely between the two rollers.

Figure 4:
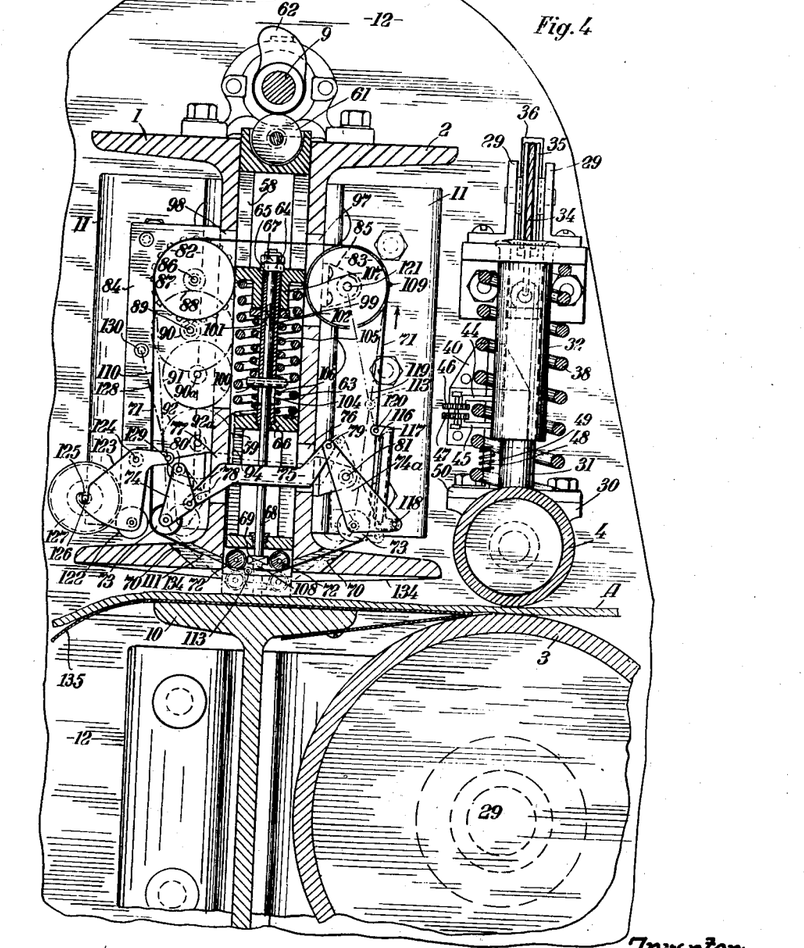
Fig. 4 is a section on the line IV—IV of Fig. 1, also on a larger scale.
Figure 10:
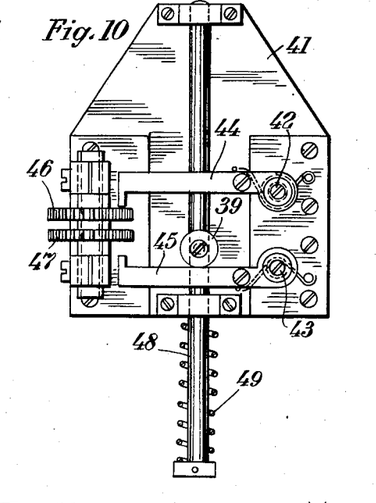

The putting into and out of operation of the electromotor is effected by means of the pedal 17 in unison with the raising and lowering of the pressing roller 4. For this purpose a contact device 40 is provided on each of the two side plates 12, one of which devices is shown in Fig. 4. Fig. 10 shows the contact device 40 on a larger scale. It consists essentially of a base plate 41 on which two contact levers 44 and 45 are rotatably mounted at 42 and 43. The contact levers are forced downwardly and upwardly, respectively, by means of springs against a disc 46 and 47, respectively, when this is permitted by a stop member 39 constructed as a roller on a control rod 48, which is urged downwardly by means of a spring 49. Its lower end lies in the path of a plate 50 of the bearing 30, so that when the pressing roller 4 and with it the bearings 30 are raised, the control rod 48 is moved along with the plate 50 and releases the contact lever 45, whereby the latter is forced by its spring against the contact disc 47 and thereby closes the circuit of a relay, which in turn switches on the driving motor. If the pedal 17 is depressed still further so that the pressing roller 4 is removed still further from the feed roller 3, then the stop roller 39 comes into engagement with the upper contact lever 44 and raises it from its contact disc 46, whereby the relay circuit and with it the motor circuit is interrupted and the machine is stopped. The contact discs 46 and 47 are constructed as screws so that their mutual spacing can be adjusted as desired. The adjustment is effected in such a manner that the driving motor is switched on when the distance between the roller 4 and the roller 3 lies in the limits between for instance 1.5 and 10 mm. It is assumed in this connection that 1.5 mm. is the least thickness of the material to be measured which comes into question and that the greatest thickness met with lies at about 8 mm.

By this means the result is attained that when the material to be measured has run through the machine and consequently the pressing roller 4 is lowered on to the feed roller 3, the driving motor is automatically stopped, while on the other hand the motor automatically starts up as soon as the pressing roller 4, which during the introduction of the material to be measured is raised above the 10 mm. limit to start with, is lowered, by releasing the pedal, the roller 4 resting on the material to be measured and passing below the 10 mm. limit. The motor can be stopped at will by depressing the pedal.

Figure 11:
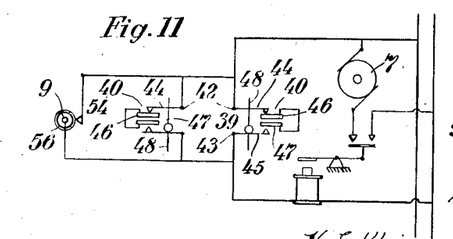
Fig. 11 is a diagram showing the appertaining switching arrangement.

When the machine is stopped it is necessary that the passage between the undersides of the channel irons 1, 2 and the upper side of the I-beam 10 be free from the feeling and stamping devices, in order on the one hand that the material to be measured to be fed into the machine will not encounter any obstruction by these devices and on the other hand that the delicate parts of the stamping devices are not damaged by the introduction of the material to be measured. For this purpose, an arrangement is provided which, after the interruption of the circuit of the driving motor, permits the latter to run until the measuring and stamping devices actuated by the camshaft 9 are withdrawn from the space between the channel irons and the I-beam. The arrangement consists substantially in a contact device 52 which, as shown in Fig. 11, is connected up in parallel to the above described contact devices 40, which in turn are connected up in parallel to one another. The device comprises in addition a contact lever 54 (Fig. 2) which is rockably mounted at 53 and is pressed by a spring 55 against a contact disc 56 mounted on the camshaft 9. The contact place thereby formed is interrupted as soon as the measuring and stamping devices, the movement of which is dependent on the camshaft 9, have moved so far downwardly that they leave free the passage through for the material to be measured.

Figure 1:
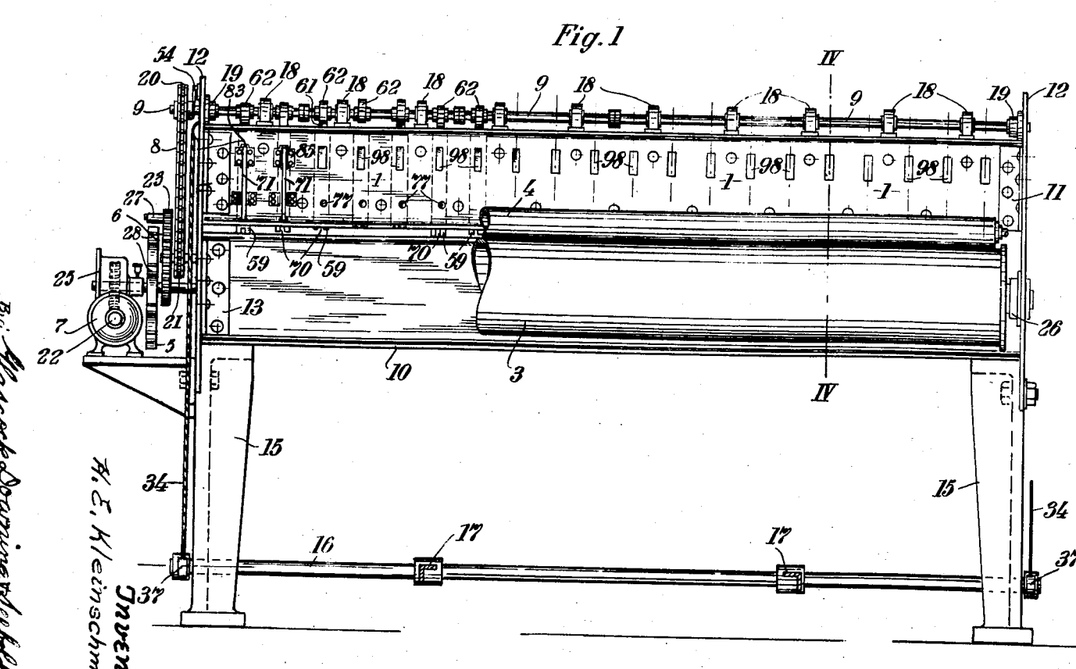
Fig. 1 shows a preferred constructional form of the new machine in an elevation viewed from the front, with parts broken away.
Figures 2, 9:
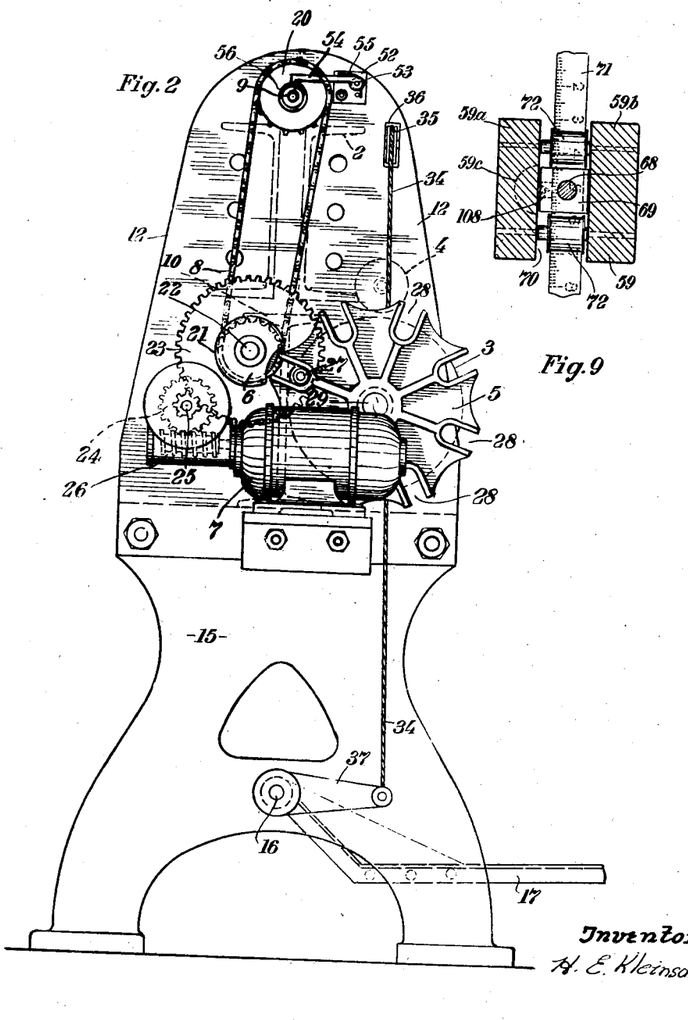
Fig. 2 is a side elevation of the machine viewed from the left, on a larger scale.
Fig. 9 shows on a larger scale a horizontal section on the line IX of Fig. 3.
Figure 8:
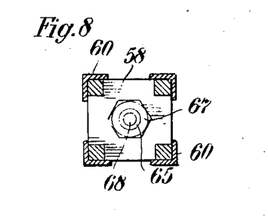

One of the twenty measuring and stamping devices will now be described. These devices (Fig. 4) contain two piston-like members 58 and 59 which, in order to make them as light as possible, are skeletonized in the form of a cage (Fig. 8) and preferably consist of light metal such as an aluminum alloy. The two piston members are guided between angle rails 60 which are arranged at suitable distances apart from one another between the channel irons 1, 2 and are connected to the web portions 1a and 2a thereof. The upper member 58, which in the claims is specified as a driver, is constructed at its upper end as a bearing for a roller 61 which co-operates with a cam 62 fixed on the shaft 9. In the space between the two pistons 58 and 59 is fitted a powerful helical spring 63 which tends to force the two pistons apart. The pressure of the spring 63 is taken up by a stop 64 of a tubular sleeve 65 passed through central bores of the two pistons and which at its lower end is screwed into the upper plate 66 of the piston 59. The stop is formed by a nut and a lock nut 67. In the tubular sleeve 65 is disposed a rod 68 which is slidable up and down and the lower end of which bears a head 69. This head as shown more particularly in Fig. 9 is guided in a groove 70 extending through the lower end of the piston 59 in the direction of feed of the material to be measured. During the stamping operation, the head 69 presses upon the band-form type carrier 71 which runs along below it. By this means the point in question of the measurement graduation of the type carrier band, hereinafter briefly referred to as the measuring band, is caused to make an impression on the material to be measured. The measuring band 71 which preferably consists of thin spring steel is guided over two guide rollers 72 rotatably mounted in the groove 70 in such a manner that the section of the band between the two rollers runs parallel to and in close proximity to the underside of the head 69 of the printing rod. The band 71 then runs over two further guide rollers 73, each of which is rotatably mounted on a lever 74, 74a, respectively, the said levers being pivoted symmetrically to the plane (central plane) passing through the middle of the printing rod 68 and extending in the longitudinal direction of the machine. The levers 74, 74a are connected to one another by means of a common link 75 which passes through slots 76, 77 in the webs of the channel irons 1, 2. The link engages the levers 74, 74a by its ends at the points 78, 79 which lie equidistant from the pivots 80 and 81, respectively, of these levers. The point of articulation 78 lies upon the one side of the pivots 80, 81 respectively, and the point of articulation 79 lies on the other side thereof in such a manner that, when for instance one roller 73 with one lever 74 executes a swinging movement inwardly, the other roller executes exactly the same swinging movement inwardly. By this means the effect is attained that the rollers 73 and with them the measuring band lie at all times symmetrically to the central plane.

Figure 5:
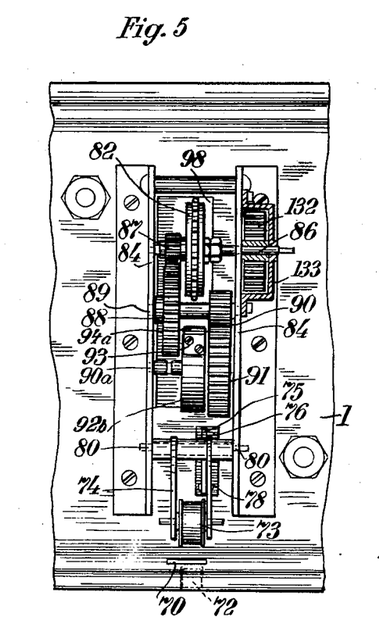
Fig. 5 is a portion of the machine viewed from the rear with a somewhat modified form of the transmission mechanisms.
Figure 6:
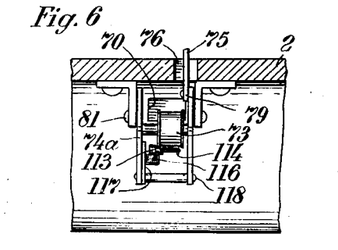
Fig. 6 shows a portion of the machine in horizontal section on the line VI—VI of Fig. 3.
Figure 7:
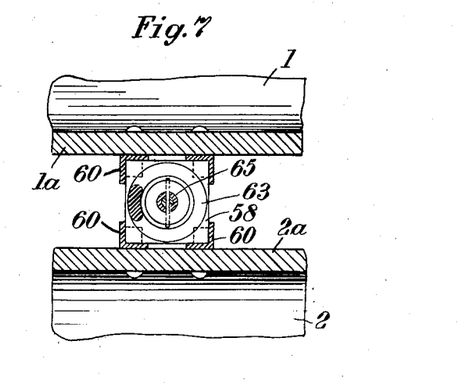
Figs. 7 and 8 are horizontal sections through parts of the machine on the lines VII—VII and VIII—VIII respectively of Fig. 3 and on the same scale as the latter figure.

The further guiding of the measuring band is effected with the aid of two discs 82, 83, the first of which is rotatably mounted between two plates 84 secured to the web of the channel iron 1a and the latter of which is rotatably mounted on two brackets 85 secured to the web of the channel iron 2. The disc 82 is provided on its periphery with teeth which can engage in corresponding holes in the band 71. On the shaft 86 of the disc 82 is fixed a pinion 87 which meshes with a gear wheel 88 which is mounted on a shaft 89 which carries a pinion 90 and similarly to the shaft 90a of a third gear wheel 91 is mounted in the plates 84. In engagement with the gear wheel 91 is a further gear wheel 92 which is mounted on a shaft 92a which is likewise journalled in the plates 84, the wheel 92 also meshing with teeth 94 provided on the piston 59. By this means the result is obtained that during the downward movement of the piston 59 the gear wheel 92 and with it, through the intermediary of the gearing 91, 90, 88 and 87, the toothed disc 82 hereinafter referred to as the transport disc is turned and namely at such a speed that it exceeds that of the movement of the piston 59 several times, in the case illustrated ten times. The connection between the piston 59 and the gear wheel 91, instead of being effected through the gear wheel 92 as shown in Fig. 5, could also be effected through the intermediary of a metal band 94a which is secured at one end to the piston 59 at the bottom and at the other end with the aid of screws 93 to the periphery of a disc 92b which is fixed on the shaft 90a of the gear wheel 91. The gear wheel 92 is then dispensed with. The disc 83 is arranged symmetrically with respect to the central plane to the disc 82 and is of the same size as the latter. For guiding through the upper horizontal run of the band 71 apertures 97, 98 are provided in the webs of the channel irons 1, 2.

Upon the tubular sleeve 65 are loosely mounted at a certain distance apart from one another two stops 99, 100 constructed as annular discs. The upper disc 99 is connected by means of a pin 101 to the printing rod 68, the pin being guided by a slot 102 in the tubular sleeve 65. The lower disc 100 is rigidly connected to the rod 65 by means of a pin 103 which is passed through two slots in the tubular sleeve 104. Between the two stop discs 99 and 100 is arranged a spring 105 and between the lower discs 100 and the part 66 of the piston 59 is arranged a weaker spring 106. The upper stop disc 99 under the pressure of the spring 105 bears against the downwardly directed extension 107 of the upper piston 58.

The head 69 of the presser rod 68 extends, as is shown more particularly in Fig. 9, laterally over the measuring band 71 and here carries a projection 108 upon which a mark in the form of a V and hereinafter referred to as the index is incised. This projection extends over the lower surface of the head 69 approximately by the amount of the thickness of the part of the band 71 provided with the measurement graduation. This band is provided at 109 (Fig. 3) with a clasp member in order to enable it to be laid over the various guide rollers. In the region of the driver disc 82, the band 71 is provided with perforations, as already mentioned, corresponding to the teeth of this disc. The covering of the band 71, which preferably consists of soft rubber vulcanised on to it and which bears the measurement graduation begins at 110 (Fig. 4) and ends at 111. The nature of the measurement graduation is shown in Fig. 9. The figures give the thickness of the material to be measured in millimetres. The direction of the movement which is executed by the band during the lowering of the pistons 58, 59 is indicated in Fig. 4 by an arrow. This figure shows in full lines the position of the measuring band 71 in the inoperative position, i. e. when the piston 59 is in the completely raised position, while by means of the dot and dash lines the position of the band as well as its lower guide rollers 72, 73 and the equalising linkage 74, 74a and 75 is shown in the lowered position of the piston 59 in which the piston rests upon the material to be measured A.

Figure 3:
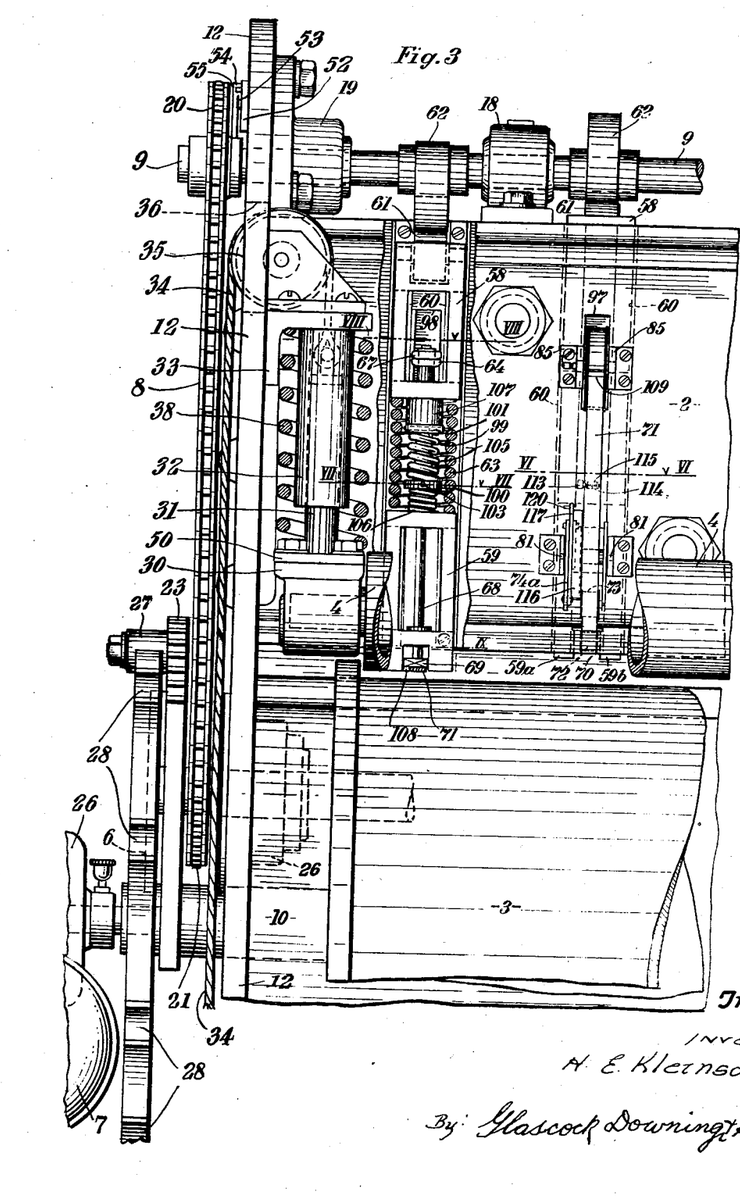
Fig. 3 is a view of the left hand end of the machine on a still larger scale viewed from the front.

In the direction of movement of the band 71, approximately, before the end 11 of the stamp rubber covering and preferably between the left hand guide roller 72 and the index projection 108 is mounted on the band 71 a small inking roller 113 which serves for providing the lower stamp surface of the index with ink. The small roller 113, as shown particularly in Fig. 3, is mounted on a spindle 114 which is journalled in a small bearing block or bracket 115 riveted on the band 71. The bracket 115, in order to avoid damage by projecting parts of the material to be measured, is preferably bridged over by a metal band which is connected at both ends to the band 71. The roller 113 takes up the ink from a strip-shaped ink pad 116 (Fig. 4) which is mounted on a Z-shaped arm 117 which is pivoted at 118 on the lever 74a which carries the guide roller 73. On the arm at 120 engages a helical spring indicated by the dot and dash lines 119 and which at its other end is hooked on to the axle 121 of the disc 83 or on to another place which is situated in the neighbourhood of the point where the band 71 runs upon the disc 83. By means of this arrangement the result is obtained that the effective surface of the ink pad 116 in all positions of the measuring band extends approximately parallel to the same, so that the inking roller 113 mounted upon the band 71 will roll properly over the ink pad.

The inking of the rubber covering 110, 111 provided with the measurement graduation is effected by means of an inking roller 122 which is rotatably mounted on an angle lever 123 which in turn is suspended so as to be capable of swinging at 124 on the plates 84. The angle lever 123 is made double and its two cheeks are at 125 provided with slots for the reception of the axle 126 of a disc 127. This disc serves as rotating ink pad and for this purpose is provided with a felt covering saturated with ink which under the weight of the disc 127, if need be assisted by spring action, bears against the inking roller 122. This roller is forced against the measuring band 71 running over the guide roller 73 by means of a spring 128 which at one end engages the angle lever 123 at 129 and at its other end is suspended at 130.

One of the two limbs 59a, 59b formed by the slot 70 in the lower part of the piston 59 (Fig. 9), preferably that one 59a adjacent the index projection 108 extends downwardly, preferably by a few tenths of a millimetre beyond the other limb in order that it may determine the thickness measurement. As indicated by a dot and dash arcuate line 59c, an additional projecting part may be provided on the lower side of the limb 59a in immediate proximity to the index, which determines the actual measuring point.

The mode of operation of the machine is as follows: The leather or the like to be marked, after the worker by depressing the pedal 17 has raised the roller 4 (Fig. 4) from the roller 3, is pushed into the nip of the rollers. If the worker now releases the pedal, then the roller 4 drops on to the material to be measured under the force of its pressing springs 38. At the same time by the aid of the switching devices 40 the working circuit of the driving motor 7 is switched on, so that the feed roller 3 is set in rotation. After it has rotated through an eighth of a revolution it comes to a standstill because the pin 27 (Fig. 2) of the Maltese cross drive then passes out of the respective slot 28 of the Maltese cross. The shaft 22 and with it the camshaft 9, however, continue to rotate and each of the cams 62 forces the piston 58 appertaining thereto and with it, through the intermediary of the spring 63, the piston 59 downwardly until the latter rests upon the material to be measured (Fig. 4). The piston 59 then remains stationary while the piston 58 is lowered further by means of the cam 62 appertaining thereto, the spring 63 being further stressed. In this manner the piston 59 is pressed firmly upon the material to be measured so that any bulges which may be present are flattened out. In the meantime the pin 101 of the upper stop disc 99 has reached the lower end of the slot 102 in the printing rod 68, so that during the further lowering of the piston 58 the rod 68 is also carried along with it against the action of its spring 106 which acts upwardly. By this means the printing head 69 bears against the lower horizontal section of the measuring band 71. This band in the meantime has been brought into such a position by means of the gear wheel drive 92, 91, 90, 88, 87 that the place in the measurement graduation corresponding to the thickness value of the leather A at the measuring point passes opposite the index 108 (Fig. 9). In the case illustrated it is assumed that the thickness value of the material being measured, which corresponds to the distance of the piston 59 from the table 10 at which it comes to rest when its underside presses upon the material to be measured, amounts to 5.2 mm. During the further lowering of the piston 58 the presser head 69 presses the place in the measuring band situated below it and simultaneously therewith the index stamp 108 down on the leather, namely with a force which is determined by the force of the compressing spring 105. This spring is still compressed to a certain extent after the highest point of the cam 62 has moved past the roller 61. After the highest part of the cam has passed the roller 61 of the piston system 58, 59 must move upwardly again. In the case illustrated this is effected by means of a spiral spring 132 (Fig. 5) the outer end of which is attached to a casing 133 which encloses it, while its inner end engages the shaft 86 of the driver disc 82. The spring 132 is stressed when the piston 59 is lowered while as soon as the downward pressure on the piston 59 ceases the spring draws the piston upwardly again through the intermediary of the transmission gear. Of course when this takes place, through the intermediary of the spring 63, the piston 58 is also carried along with it so that its roller 61 bears continuously against the cam 62.

While the lower end of the piston 59 is still executing the last portion of its upward motion, during which it recedes behind two sheet metal protecting plates 134 provided on the undersides of the lower surfaces of the U-irons 1, 2 the pin 27 engages again in the next slot 28 of the Maltese cross 5, so that the roller 3 executes a further partial rotation and the leather A is pushed forward by the amount of a further partial rotation. While this movement is still continuing the piston 59 commences to sink again. In this manner, the pauses in the feed movement of the material being measured are utilised to the utmost in the interests of speeding up the work. This is all the more important since preferably all the measuring and stamping units do not operate simultaneously. The units on the contrary are divided up into separate groups, in the present case four. The five cams 62 of each of these groups come into action one after the other. By this means on the one hand any excessive sudden loading of the machine corresponding to the sum of the maximum compressive forces is avoided and on the other hand the result is obtained that any bulges in the material to be measured can be smoothed out to a certain extent sideways by the successive application of the pistons 59.

In this manner the values corresponding to the leather thicknesses measured during each pause in the movement are stamped upon the leather in rows extending transversely to the feed direction together with the index marks, which latter indicate the exact thickness value. When the piece of leather has been stamped in rows in this manner the motion of the machine is automatically interrupted. This is effected by the pressure roller 4 sinking after the rear edge of the leather has passed through from below the pressure roller and thereby causing the driving motor to be stopped in the above described manner.

In the illustrated constructional form of the machine the pistons 59 constitute at the same time the flat holding members or flatteners which press the material being measured flat upon the abutment or support formed by the carrier 10 and the feelers which determine the distance of the upper surface of the material being measured from the abutment and thereby the thickness of the material being measured. The feelers and flattening holders of each measuring device may also form members which are separate from one another.

The transport disc 82 is not fixed absolutely rigidly to its shaft 86 but on the contrary, after a nut 86a which ordinarily presses it firmly against a collar on the shaft 86 has been released, can be turned on the shaft. By this means the measuring band 71 can at all times be adjusted into the correct position. The initial adjustment is effected e. g. by allowing the piston 59 without the interposition of a layer of leather or the like to drop on to the abutment 10. As soon as the piston on resting firmly upon the abutment comes to rest, the zero point of the measurement graduation of the band 71 must be located opposite the point of the index of the projection 108. The transport disc 82 is therefore rotated upon its shaft until this is the case and the nut 86a is then tightened up. Preferably a further mark is provided on the band 71 at a point which can be conveniently viewed, which in the zero position of the band lies opposite a pointer fitted fixedly on the machine frame. It then suffices, when the measuring band has to be adjusted for any reason, to bring this mark into coincidence with the pointer by rotating the transport disc 82 and then drawing the disc 82 up tight again.

Figures 12, 14:
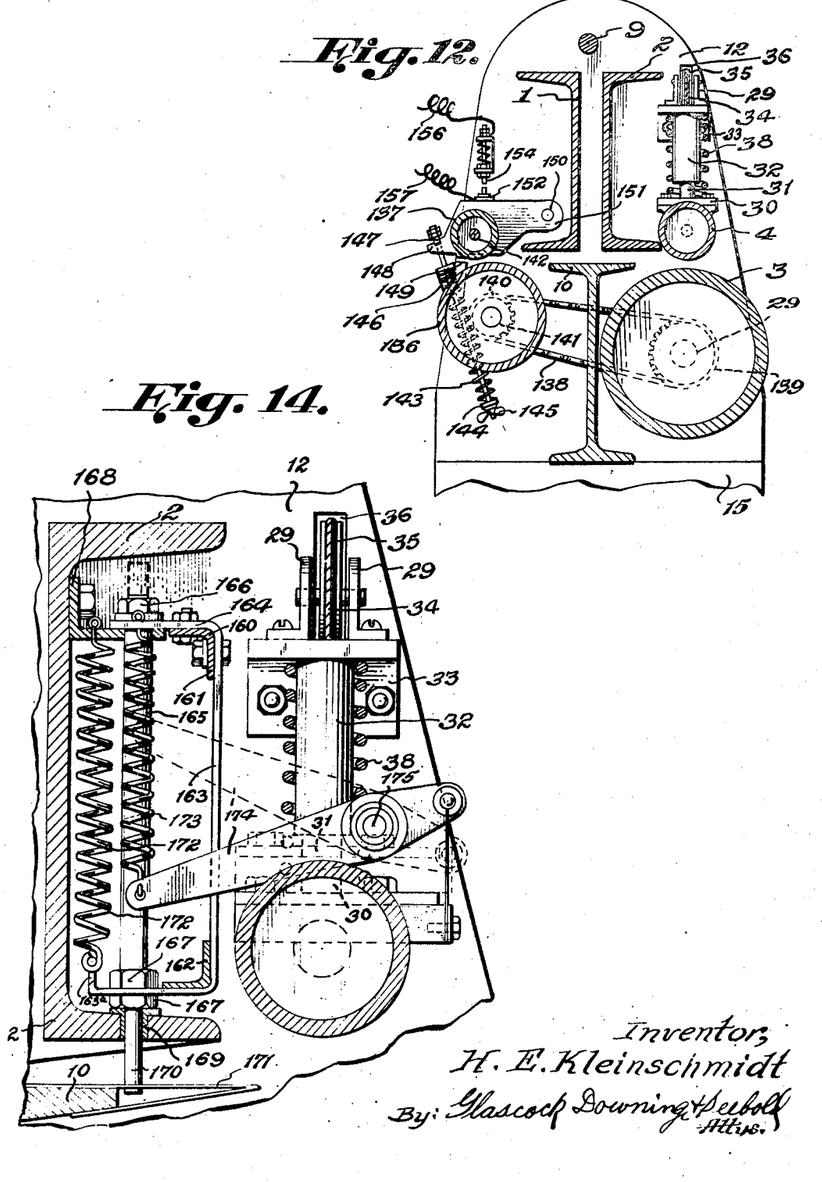

In the constructional form of the machine described, as already mentioned, the feed roller 3 is automatically stopped as soon as the leather at its rearward edge has passed through the pair of rollers 3, 4. It may then occur, particularly when short pieces of leather are in question that the leather remains hanging in the machine, that is to say it does not of itself slide off on to the delivery apron 135 provided for this purpose adjacent the table 10. It is desirable therefore to provide on the delivery side of the machine a second pair of rollers 136, 137 after the manner of the pair of rollers 3, 4 arranged on the feed side of the machine, one roller of which, preferably the lower one, 136 is positively driven from the feed roller 3 and namely at a slightly higher peripheral velocity through the intermediary of a chain passed around two chain wheels 139, 140. Referring to Fig. 12, two rollers 136, 137 are provided on the delivery side, the lower roller 136 being journalled in the side plates 12 of the machine, while the smaller upper roller 137 is mounted on levers 151 which are pivoted on the side plates 12 on pivots 150. The roller 136 is driven from the roller 3 by means of a chain 138 which is passed round two sprocket wheels 139 and 140, the former of which is keyed on the shaft 29 of the roller 3 and the latter on the shaft 141 of the roller 136.

The roller 137 is drawn towards the lower roller 136 by means of a pair of springs 143, each of which is provided with an eye 147 which engages a hook 148 on the respective lever 151 and is secured at its other end to a block 144 fixed to the respective side plate 12. The roller 137 can only approach to within a predetermined distance, approximately 1 to 1½ mm., from the lower roller 136, since the levers 151 bear against stops 149 fixed to the side plates 12 when the upper roller has approached to within the predetermined distance from the lower roller. The tension of the springs 143 can be adjusted by means of wing nuts 145.

On each of the levers 151 is fitted a contact pin 152, which is insulated from the lever. This contact pin coacts with a second pin 154 which is guided so as to be movable up and down in a block 153 fixed to the respective side plate 12 and is urged towards the contact pin 152 by means of a spring 155. The distance between the contacts 152 and 154 can be adjusted by means of adjusting screws 158. The contact pin 154 is also insulated from the machine frame. Electric conductors 156 and 157 lead from the contact pins 152 and 154, as shown in Fig. 11, to the circuit containing the relay for the switch of the driving motor 7, to which circuit they are connected up at the points 159 and 160. By means of this second pair of rollers the leather is then withdrawn from the machine with certainty. The stopping of the drive of the machine is only effected in this case when the rear edge of the leather has passed beyond the second pair of rollers. For this purpose the latter is likewise provided with two contact devices similar to the above described contact devices 40. The circuits of these additional contact devices are then connected up in parallel to the contact devices 40 of the pair of rollers 3, 4.

Figure 13:
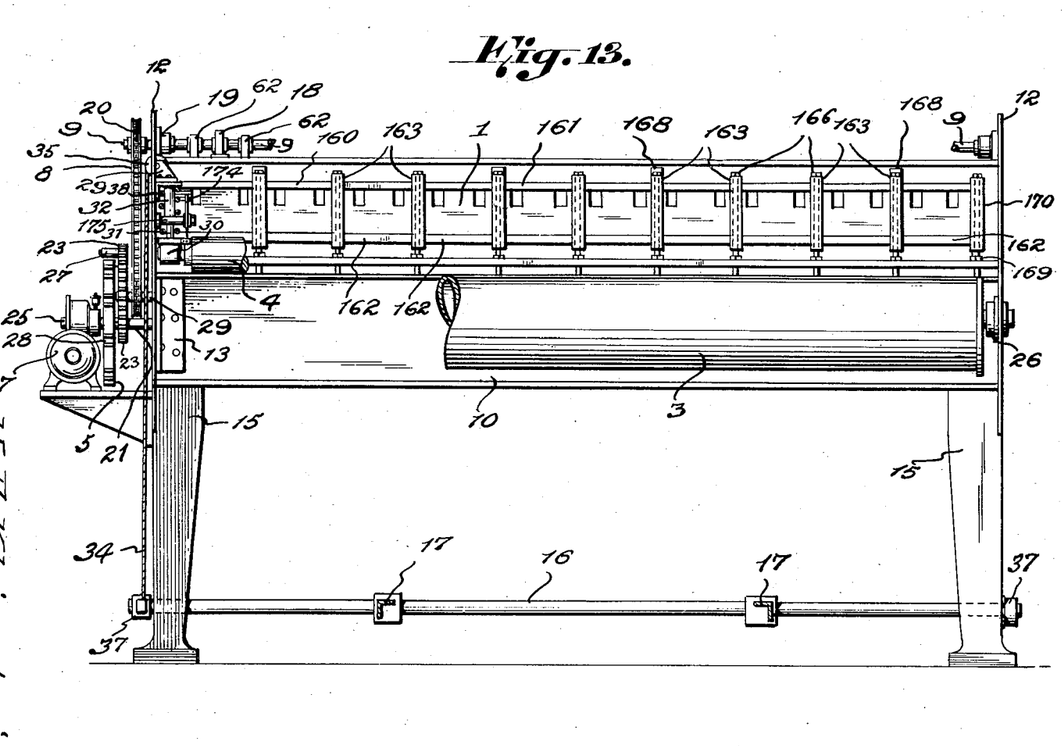
Fig. 13 is a side elevation and Fig. 14 a vertical section through the upper part of a modified form of the machine.

In order to enable the machine minder to determine with certainty how far he has to push the leather through the nip of the rollers 3, 4 in order that the first row of stamps may each time lie at a predetermined distance from the front edge of the leather, it is advisable to provide in the gap formed between the table 10 (Figs. 13 and 14) on the one hand and the lower flange of the front channel iron 2 on the other hand a row of stops 170 which will arrest the leather pushed through between the rollers 3 and 4 by the machine minder but which however as soon as the automatic feed is to commence will release the leather. For this purpose the arrangement is so devised that the stops mentioned and which e. g. may comprise bars or rods 170 guided between the upper and lower flanges of the channel iron 2 and connected by means of a common framework 160, 161, 162 to a kind of grating, are lowered through corresponding holes 169 in the flange of the lower channel iron as soon as the presser roller 4 is raised for the purpose of introducing the leather into the nip of the rollers 3, 4, the stop rods 170 on the other hand being raised again as soon as the machine minder allows the presser roller 4 to drop again for the purpose of initiating the feed movement. The raising and lowering of the stop grating may be effected for instance by means of two two-armed levers 174 pivoted at 175 on the side plates 12 of the machine, one arm of which is connected to the grating and the other arm with the bearings 30 of the roller 4. The ratio of the lengths of the lever arms is preferably such that the raising and lowering movement of the grating 160 takes place three to four times as rapidly as the lowering and raising movement of the roller 4. Further, idle motion is preferably provided in the connection between the stop grating and the arms of the said levers belonging to it as well as a spring 173 in order to cause the stop rods to close the gap between the table 10 and the channel iron 2 only after the roller 4 has run idly by a certain amount and then however to close the gap suddenly and open it again as soon as possible.

It is further to be observed that the measuring and stamping devices, instead of being arranged in a single row as above described, may also be arranged in a plurality of rows, more particularly in so many rows that the piece of material to be measured may be measured and stamped in a single operation at all points of its surface. The abutment or support must then of course be correspondingly widened and two feed movements of the material to be measured are sufficient, namely once for its introduction into the interval between the abutment table and the measuring and stamping devices and once for its withdrawal, which is preferably effected by means of a second pair of rollers provided at the rear side of the machine. On the other hand it is not absolutely necessary for the traverse which carries the measuring and stamping units to have units mounted on it over its entire length; on the contrary, a smaller number of units may be provided than the number of stamping operations which have to be effected in each row. It is then necessary in order to enable a network of stamped places of the required density to be obtained to run the material to be measured through the machine a plurality of times.

I claim:

1. Machine for marking the distribution of thickness of sheet material, especially of large pieces of leather, comprising: a support for the reception of the sheet material, a plurality of devices for measuring the thickness of the material, each of said measuring devices having a feeler movable towards and away from said support, a plurality of printing devices each arranged in close proximity of one of the said measuring devices and comprising a type-carrier, a plurality of gearings operatively connecting said type-carriers to said drivers, means adapted to feed the material step by step, periodically working means adapted to actuate said printing devices in the pauses of feeding, each of said actuating means comprising a driver adapted to engage one of said feeders by the intermediary of driver spring means, a frame providing for a rigid connection between the combined measuring and printing devices and the said support and adapted to allow the material to pass by the measuring and printing devices with its whole surface to be marked, and means to adjustably limit the mutual distance of said feelers and drivers with respect to the action of said spring means.

2. Machine as claimed in claim 1, the printing devices of which comprise a printing member adapted to be operated by said driver through the intermediary of a printing spring, said printing spring being stressed between two stops superposed one above the other on said printing member.

3. Machine as claimed in claim 1, the printing devices of which comprise a printing member adapted to be operated by said driver through the intermediary of a printing spring, said printing spring being stressed between two stops superposed one above the other on said printing member, one of said stops adapted to be engaged by said driver being in lost motion relation to said printing member.

4. Machine as claimed in claim 1, the printing devices of which comprise a printing member adapted to be operated by said driver through the intermediary of a printing spring, said printing spring being stressed between two stops superposed one above the other on said printing member, and return spring means tending to return said printing member in its initial position, said printing spring being so dimensioned as to be able to overcome the action of said return spring means.

5. In a machine as claimed in claim 1, the printing devices of which comprise a printing rod, a tubular member rigidly connected to said feeler and extending through a bore provided in said driver, said printing rod extending through said tubular member in an axial direction, and an adjustable nut threaded on the free end of said tubular member projecting above said driver.

6. Machine as claimed in claim 1, the printing devices of which comprise a printing rod, a tubular member rigidly connected to said feeler and extending through a bore provided in said driver, said printing rod extending through said tubular member in an axial direction, and an adjustable nut threaded on the free end of said tubular member projecting above said driver, a printing spring stressed between stops superposed one above the other, one of said stops having a pin rigidly connected to said printing rod and passing freely through a longitudinal slot provided in said tubular member, the other one of said stops lying in the path of said driver and having a pin passing freely through a longitudinal slot provided in said printing rod.

7. A measuring and marking machine of the class described comprising: a support, a plurality of measuring devices, each of said measuring devices having a feeler movable towards and away from said support, a plurality of printing devices each arranged in close proximity of one of the said measuring devices and comprising a type-carrier, a plurality of gearings operatively connecting said type-carriers to said drivers, means adapted to feed the material step by step, periodically working means adapted to actuate said printing devices in the pauses of feeding, each of said actuating means comprising a driver adapted to engage one of said feelers by the intermediary of driver spring means, a frame provided for a rigid connection between the combined measuring and printing devices and the said support and adapted to allow the material to pass by the measuring and printing devices with its whole surface to be marked, and drawback spring means engaging said type-carrier and tending to move said feelers away from said support.

8. Machine as claimed in claim 7, the gearing of which comprises a disc for transporting said type-carrier, said draw-back spring means having the form of a spiral spring mounted on the shaft of said transport disc.

9. Machine of the class described, comprising: a support for the material to be marked, a fixed frame work, a feeler member movable towards said support, a continuous flexible type-carrier guided by two pairs of guide rollers mounted in superimposed relation on a part of said frame work which is stationary relatively to said support, printing means adapted to move said type-carrier towards said support, and a gearing in engagement both with said feeler and said type-carrier, the lower pair of guide rollers being mounted transversely to the direction of movement of the feeler in such a manner as to be capable of yielding resiliently and of being displaced symmetrically with respect to the vertical plane passing the point of measurement and extending rectangularly to the direction of the feed of the material to be marked.

10. Machine as claimed in claim 9, characterised in that one of the rollers of the lower pair of guide rollers is mounted on a single-armed lever and the other on a double-armed lever, the said levers being positively connected to one another by means of a link which passes by the printing device in such a manner that the ends of the link engage at points of the levers which lie at equal distances from the pivots of the levers but which in the case of the single-armed lever lies between its pivot and the guide roller bearing and in the case of the double-armed lever lies on the opposite side of the pivot to the guide roller bearing.

11. Machine of the kind described, in which together with the section of the graduation of the type-carrier situated over the printing point a fix mark (index) is printed on the leather adjacent the printing point, comprising a type-carrier movable to and fro, an inking device for the types of said type-carrier, an index stamp, and an independent inking device for said index stamp, carried along by said type-carrier during its to and fro movement.

12. Machine as claimed in claim 11, the type-carrier comprising a flexible band, said machine having a stationary ink pad and an inking roller rotatably mounted on the type carrier band and laterally projecting beyond same, said inking roller during the displacement of the band being adapted to move along below said index stamp and to take up the ink from said ink pad.

13. Machine as claimed in claim 11, the type-carrier comprising a flexible band, said machine having a stationary ink pad and an inking roller rotatably mounted on the type carrier band and laterally projecting beyond same, said inking roller during the displacement of the band being adapted to move along below said index stamp and to take up the ink from said ink pad, and a bearing bracket for said inking roller fixed to said type-carrier band, said bearing bracket being bridged over by a metal band which is connected at both ends with the type-carrier band.

14. Machine as claimed in claim 11, the type-carrier comprising a flexible band and the inking device comprising an ink pad and an inking roller, a bearing bracket for said inking roller fixed to said type-carrier band, said bearing bracket being bridged over by a metal band which is connected at both ends with the type-carrier band, said inking roller projecting laterally beyond the band and being adapted, during the displacement of the band, to move along below said index stamp and to take up ink from the ink pad, an upper and a lower pair of guiding rollers for the type-carrier band, each roller of said lower pair of guiding rollers being carried by a lever pivotally mounted on a fixed part of the machine, said ink pad being rockably mounted on one of said levers, and a spring attached to said inking pad.

15. Machine as claimed in claim 11, the type-carrier comprising a flexible band and the inking device comprising an ink pad and an inking roller, a bearing bracket for said inking roller fixed to said type-carrier band, said bearing bracket being bridged over by a metal band which is connected at both ends with the type-carrier band, said inking roller projecting laterally beyond the band and being adapted, during the displacement of the band, to move along below said index stamp and to take up ink from the ink pad, an upper and a lower pair of guiding rollers for the type-carrier band, each roller of said lower pair of guiding rollers being carried by a lever pivotally mounted on a fixed part of the machine, said ink pad being located on an arm mounted near its one end on the appertaining guiding roller lever, a tension spring engaging with its one end the free end of said arm, the other end of said spring being attached near the point where the type-carrier band runs on to its corresponding upper guide roller.

16. Machine of the kind described comprising: a pair of feed rollers for the material to be measured provided on the entry side of the machine, a second pair of feeding rollers provided on the delivery side of the machine, means for automatically pressing together the rollers of each of said roller pairs, at least one roller of the one pair being operatively connected in a positive manner to one roller of the other pair.

17. Machine as claimed in claim 16 comprising: a device adapted to automatically interrupt the drive of the machine when the rear edge of the material being measured has passed through the second pair of rollers.

18. Machine of the kind described comprising a plurality of feelers adapted to be moved up and down and to be stopped in their raised position, a driving motor, a driving shaft for said feelers, a circuit controlling said motor, a pair of feed rollers for the material to be measured provided on the entry side of the machine, a second pair of feeding rollers provided on the delivery side of the machine, means for automatically pressing together the rollers of each of said roller pairs, at least one roller of the one pair being operatively connected in a positive manner to one roller of the other pair, two switching systems arranged in parallel to one another in said circuit, one of said systems in the position of said driving shaft corresponding to the raised position of the feelers, interrupts said circuit while the other of said switching systems includes two separate switches fitted one at each end of said presser roller, the contacts of which switches are only closed in the position situated between the maximum and minimum distances of the feed roller and the presser roller from one another provided for, and a third switching system connected up in parallel to said two first named switching systems and being in its operation dependent on the distance between the rollers of said second pair.

19. Machine of the kind described comprising a pair of feed rollers mounted one above the other on the entry side of the machine, a plurality of measuring and printing devices arranged in a row parallel to the axes of said feed rollers, and stop means between said feed roller pair and said row of measuring and printing devices, said stop means adapted to prevent the feed of the material to be measured as long as the gap between the feed rollers is opened beyond a predetermined amount, while they release the passage for the material to be measured after the gap between the rollers has closed so far that the feed of the material to be measured can commence.

20. Machine as claimed in claim 19, characterised by a system of stop rods which are commonly movable up and down on the machine frame, the said system being operatively connected to the upper roller of said feed roller pair in such a manner that the system is lowered when said upper roller is raised and raised when said upper roller is lowered.

21. Machine as claimed in claim 19, characterised by a system of stop rods commonly movable up and down on the machine frame, the said system of stop rods being connected up to the upper roller of said feed roller pair by means of two levers having arms of unequal length, the longer arms being in engagement with the said system with play and with the interposition of springs, in such a manner that the system is lowered when said upper roller is raised and raised when said upper roller is lowered.

22. Machine of the kind described in which a plurality of aggregate each comprising a feeler, a type-carrier, a printing member, a gearing engaging said type-carrier and means for operatively connecting said gearing to said feeler, are mounted on a common traverse extending in a direction at right angle with the feeding direction of the material to be measured, said connecting means extending through an opening provided in said traverse.

23. Machine as claimed in claim 22, in which a plurality of aggregates each comprising a feeler, a type-carrier, a printing member, a gearing engaging said type-carrier and means for operatively connecting said gearing to said feeler, are mounted on a common traverse extending in a direction at right angle with the feeding direction of the material to be measured, said connecting means comprising a tension member extending through an opening provided in said traverse and being attached on its one end to said feeler and on its other end to the lowermost member of said gearing.

24. Machine of the kind described, comprising an intermittently rotated feed roller for the material to be measured provided on the entry side of the machine, a presser roller journalled above said feed roller, automatic means to yieldingly press said presser roller against said feed roller, means to arbitrarily raise and lower said presser roller, and interrupting means to interrupt the drive of the machine automatically when the distance of the presser roller from the feed roller falls below a definite amount corresponding to the minimum thickness of the material being measured or when said distance exceeds an amount corresponding to the maximum thickness.

25. Machine of the kind described, comprising an intermittently rotated feed roller for the material to be measured provided on the entry side of the machine, a presser roller journalled above said feed roller, automatic means to yieldingly press said presser roller against said feed roller, means to arbitrarily raise and lower said presser roller, and interrupting means to interrupt the drive of the machine automatically when the distance of the presser roller from the feed roller falls below a definite amount corresponding to the minimum thickness of the material being measured or when said distance exceeds an amount corresponding to the maximum thickness, said interrupting means comprising a plurality of feelers adapted to move up and down and to be stopped in their raised position and being operative to stop the drive of the machine only when said feelers are all situated in their raised position allowing free passage for the material to be measured.

26. Machine of the kind described, comprising an intermittently rotated feed roller for the material to be measured provided on the entry side of the machine, a presser roller journalled above said feed roller, automatic means to yieldingly press said presser roller against said feed roller, means to arbitrarily raise and lower said presser roller, and interrupting means to interrupt the drive of the machine automatically when the distance of the presser roller from the feed roller falls below a definite amount corresponding to the minimum thickness of the material being measured or when said distance exceeds an amount corresponding to the maximum thickness, said interrupting means comrising a plurality of feelers adapted to move up and down and to be stopped in their raised position, a driving motor, a driving shaft for said feelers, a circuit controlling said motor, two switching systems arranged in parallel to one another in said circuit, one of said systems in the position of said driving shaft corresponding to the raised position of the feelers, interrupts said circuit while the other of said switching systems includes two separate switches fitted one at each end of said presser roller, the contacts of which switches are only closed in the position situated between the maximum and minimum distances of the feed roller and the presser roller from one another provided for.

HANS ERICH KLEINSCHMIDT.